United States Patent [19]

Yoshino

[11] Patent Number: 4,991,012
[45] Date of Patent: Feb. 5, 1991

[54] TELEVISION RECEIVER DISPLAYING MULTIPLEX VIDEO INFORMATION ON A VERTICALLY OBLONG DISPLAY SCREEN AND AN INFORMATION DISPLAYING METHOD THEREOF

[75] Inventor: Toshihiko Yoshino, Ikeda, Japan

[73] Assignee: Matsushita Electric Industrial Co., Ltd., Osaka, Japan

[21] Appl. No.: 342,890

[22] Filed: Apr. 25, 1989

[30] Foreign Application Priority Data

Apr. 28, 1988 [JP] Japan .................. 63-106360

[51] Int. Cl.⁵ ............... H04N 5/272; H04N 5/278
[52] U.S. Cl. ............................. 358/183; 358/22
[58] Field of Search .............. 358/183, 182, 22, 181, 358/56, 59, 230, 236, 241, 237, 242, 254; 340/731

[56] References Cited

U.S. PATENT DOCUMENTS

| | | | |
|---|---|---|---|
| 3,497,760 | 2/1970 | Kiesling | 340/731 |
| 4,399,462 | 8/1983 | Balopole et al. | 358/183 |
| 4,650,929 | 3/1987 | Boerger | 358/183 |
| 4,675,736 | 6/1987 | Lehmer | 358/183 |
| 4,729,028 | 3/1988 | Micic | 358/183 |
| 4,729,029 | 3/1988 | Henri | 358/183 |
| 4,746,981 | 5/1988 | Nadan | 358/22 |
| 4,751,507 | 6/1988 | Hama | 340/731 |
| 4,785,296 | 11/1988 | Tabata | 340/731 |
| 4,841,363 | 6/1989 | Ams | 358/183 |

FOREIGN PATENT DOCUMENTS

| | | | |
|---|---|---|---|
| 208772 | 12/1982 | Japan | 358/183 |
| 61-376 | 1/1986 | Japan . | |
| 62-66472 | 4/1987 | Japan . | |
| 63-87960 | 6/1988 | Japan . | |
| 2165719 | 4/1986 | United Kingdom . | |

Primary Examiner—Tommy P. Chin
Attorney, Agent, or Firm—Stevens, Davis, Miller & Mosher

[57] ABSTRACT

A television receiver includes a vertically oblon CRT having an aspect ratio of about 3:4, and a first and a second display part each having an aspect ratio of about 4:3 are formed together with a third display part (a status display part) in the display area of the CRT, so that a picture-in-picture display, a teletext display, etc. can be simultaneously produced on the first and second display parts together with a status display on the third display part without cutting out part of the displayed video information.

4 Claims, 3 Drawing Sheets 4,991,012

TELEVISION RECEIVER DISPLAYING MULTIPLEX VIDEO INFORMATION ON A VERTICALLY OBLONG DISPLAY SCREEN AND AN INFORMATION DISPLAYING METHOD THEREOF

BACKGROUND OF THE INVENTION

This invention relates to a television receiver capable of simultaneously displaying a plurality of video information on the display screen of a single cathode-ray tube (abbreviated hereinafter as a CRT), and relates also to a method of displaying such video information.

Sources of inputs to a television receiver include not only ordinary television broadcasting stations but also a variety of other sources such as a satellite broadcasting station, a teletext broadcasting station, a CAPTAIN (character and pattern telephone access information network) system, a computer display and a VCR (a video cassette recorder), and the television receiver is demanded to display such many signals. These signals may contain video information interrelated with each other, and it may be preferable to simultaneously display those video information on the single CRT display of the television receiver. For example, a television viewer may desire to see characters of teletext broadcasting in addition to a picture being televised or may desire to simultaneously see different pictures on the same display screen of the television receiver. Thus, when the viewer seeing, for example, sports program desires to read a news program at the same time, it is necessary to simultaneously display characters of teletext broadcasting on the same display screen of the television receiver. In such a case, a method of superimposing the characters on the televised picture according to a so-called picture-in-picture mode or a method of cutting out a part of the televised picture and inserting the characters in that part of the display screen is commonly employed.

However, the methods described above are defective in that a part of the picture is lost due to insertion of the characters, and the entire picture cannot be completely reproduced.

SUMMARY OF THE INVENTION

It is an object of the present invention to provide a television receiver in which a single CRT display capable of simultaneously displaying multiple video information is used to satisfy the above demand without giving rise to the loss of any one of displayed pictures. Another object is to provide a method of displaying such video information.

Commonly, a CRT having an aspect ratio of 4:3 is used in an attitude in which the longer side of its display screen extends in the horizontal direction. Such a CRT is used in the present invention in an attitude in which the longer side of its display screen extends in the vertical direction. In the CRT disposed in such a direction, its display screen is divided to define a first display are which is horizontally oblong and in which the aspect ratio between the longer horizontal side and the shorter vertical side is about 4:3. The dimension of the vertical side is given by $$3 \times \frac{1}{4} \approx 2.25.$$

A guard band portion (a boundary portion) is formed in the remaining area of the display screen, and a horizontally oblong second display part is defined in the remaining area of the display screen. In this second display part, the vertical dimension of the remaining area of the display screen, except the guard band portion, is taken as the basis, and the aspect ratio between the longer horizontal side and the shorter vertical side is set at about 4:3. Further, another guard band portion is formed in the final remaining area of the display screen to define a third display part which is vertically oblong. Thus, a total of three display parts are formed which include one large display part, one small display part and one smaller display part.

When the display screen of the CRT is divided into such display parts, the number of horizontal scanning lines in a television signal applied to display video information on the display parts having the usual aspect ratio of about 4:3 is, for example, 525 according to the NTSC standards and 625 according to the PAL/SECAM standards. The number of horizontal scanning lines on the guard band portions is about 25 in the case of the NTSC standards and about 30 in the case of the PAL/SECAM standards. Therefore, the total number of horizontal scanning lines is $525 \times 2 + 25 = 1,075$ in the case of the NTSC standards and $625 \times 2 + 30 = 1,280$ in the case of the PAL/SECAM standards. On the other hand, when the vertical frequency is selected to be 60 Hz (NTSC) or 50 Hz (PAL/SECAM), the calculated horizontal frequency is $1,075 \times 60 = 64.5$ kHz in the case of the NTSC standards and $1,280 \times 50 = 64$ kHz in the case of the PAL/SECAM standards.

However, because of the difference between the area of the first display part and that of the second display part, the horizontal scanning lines scanning the second display part must be partly skipped at a constant rate when the horizontal scanning speed is fixed. In order to eliminate the above requirement and so that the required circuit can be relatively easily constructed without appreciably degrading the picture quality, it is preferable to employ a method in which the speed of vertical scanning only is switched over at the boundary between the first display part and the second display part while maintaining constant the speed of horizontal scanning.

This vertical scanning speed need not be limited to the prior art value of 50 Hz or 60 Hz and can be freely selected. Especially, when the vertical scanning speed is set at 50 Hz, flicker is frequently sensed. Therefore, the vertical frequency may be selected to be about two times as high as the value of 50 Hz so as to remove appearance of the flicker. Similarly, in the case of the horizontal scanning speed too, the same line is scanned twice to substantially double the number of horizontal scanning lines so as to compensate the decreased scanning line density.

DESCRIPTION OF THE PREFERRED EMBODIMENTS

Figure 1:
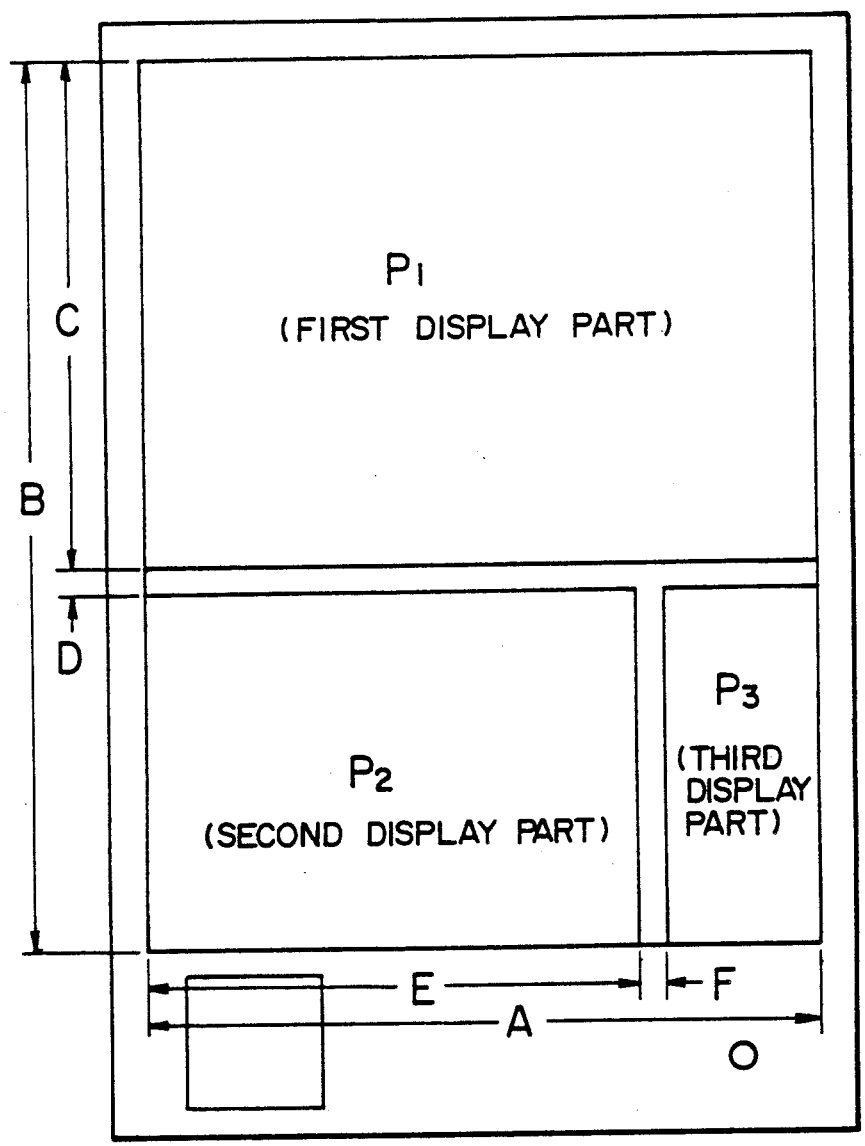
FIG. 1 is a schematic front elevation view of a preferred embodiment of the television receiver according to the present invention.

Referring to FIG. 1 which is a schematic front elevation view of a preferred embodiment of the television receiver of the present invention, its CRT display screen is divided into a first display part $P_1$, a second display part $P_2$ and a third display part $P_3$ as described already. The CRT display screen has a horizontal length A and a vertical length B. The symbols C and E designate the vertical length of the first display part $P_1$ and the horizontal length of the second display part $P_2$ respectively. The symbols D and F designate the width of the guard band portions.

Figure 2:
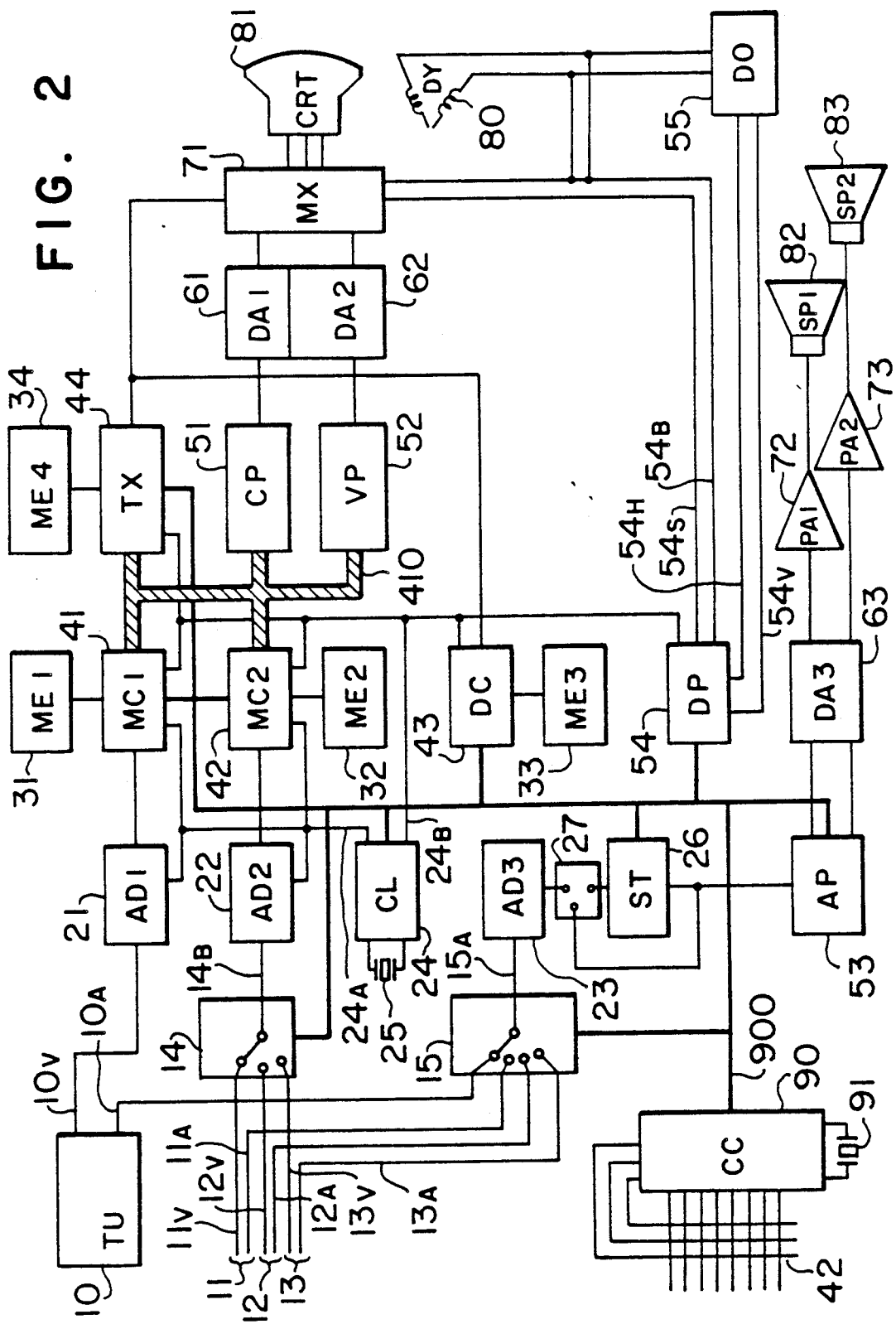
FIG. 2 is a block circuit diagram of the television vision receiver of the present invention.

FIG. 2 is a block circuit diagram of the preferred embodiment of the television receiver of the present invention. Referring to FIG. 2, a tuner 10 generates baseband outputs 10V and 10A which are a composite video signal and an audio signal respectively. External input signals 11, 12 and 13 include opposite video signals 11V, 12V, 13V and video signals 11A, 12A, 13A respectively. In this case, these audio signals are commonly applied in the form of decoded two-channel stereo signals. Therefore, an output signal 15A of an audio input signal selector switch 15 is a one-channel signal when the audio signal 10A is selected by the switch 15. In other cases, one of the two-channel stereo signals 11A, 12A and 13A is selected by the switch 15. However, the one-channel signal 15A only is shown in FIG. 2 so as to simplify the illustration. Another selector switch 14 selects one of the composite video signals 11V, 12V and 13V of the respective external input signals 11, 12 and 13. FIG. 2 shows that the video signal 11v is selected, and an output signal 14B appears from the selector switch 14.

Reference numerals 21, 22 and 23 designate Analog-digital (AD) converters $AD_1$, $AD_2$ and $AD_3$ respectively. FIG. 2 shows that the AD converters $AD_1$ and $AD_2$ convert the video signals 10V and 14B into corresponding digital signals respectively, and the AD converter $AD_3$ converts the audio signal 15A into a corresponding digital signal. Field or frame memories 31 and 32 store one field or one frame of video information to be displayed. Recording of video input signals in the field or frame memories 31 and 32 and reading of the recorded signals from those memories 31 and 32 are controlled by associated controllers 41 and 42 respectively. A display memory 33 is controlled by an associated controller 43 having a built-in character generator. The outputs of the controllers 41 and 42 are connected to a bus line 410 and are further connected to a teletext decoder 44, a color processor 51 and a video processor 52 by the bus line 410.

A teletext page memory 34 is a memory provided for recording a teletext signal. The teletext page memory 34 is connected to the teletext decoder 44 whose output signal is applied to a matrix circuit 71. The output signals of the color processor 51 and video processor 52 are applied through respective Digital-Analog (DA) converters 61 and 62 to the matrix circuit 71 to be converted into analog signals of R, G and B, and, after being amplified, these analog signals are applied from the matrix circuit 71 to a CRT display 81.

A processor 54 provided for generating scanning signals generates a horizontal scanning signal 54H and a vertical scanning signal 54V. After being amplified by an amplifier 55, the horizontal and vertical scanning signals 54H and 54V are applied to a deflection yoke assembly 80. The audio output signal of the selector seitch 15 is converted by the AD converter 23 into a corresponding digital signal, and this digital signal is applied to a stereo decoder 26 to be converted into a stereo signal or a dual audio signal. As described already, an external input signal is commonly applied in the form of a stereo signal (a two-channel signal). Therefore, the stereo decoder 26 is unnecessary except the case where the selector switch 15 selects the audio signal 10A. In such a case, a switch 27 disposed in the preceding stage of the stereo decoder 26 is changed over in interlocking relation, and the digital output signal of the AD converter 23 bypasses the stereo decoder 26. An audio processor 53 is provided to control the volume, balance, bass, treble, etc. of the stereo signal. The digital output signal of the audio processor 53 is converted by a DA converter 63 into a corresponding analog signal, and the analog output signal of the DA converter 63 drives speakers 81 and 82 through respective power amplifiers 72 and 73.

A clock generator 24 generates a clock signal used for writing and reading information in and from the memories 31, 32 and 33 and for other control purposes, and an oscillator 25 oscillates at the basic frequency of the clock signal generated from the clock generator 24.

A microprocessor 90 having an associated clock oscillator 91 and an associated input key matrix 92 controls the television system. In order to simplify the illustration, various control signals generated from the microprocessor 90 are transmitted via a control bus line 900 shown by a thick black line.

The operation of the television receiver will now be described.

When now the selector switch 14 is set at an illustrated switching position, the video signal 10V from the tuner 10 is applied through the AD converter 21 and controller 41 to the memory 31, so that the AD-converted video signal is recorded in the memory 31. On the other hand, the video signal 11V of the external input signal 11 is applied from the switch 14 to the memory 32 after being passed through the AD converter 22 and controller 42, so that the AD-converted video signal is recorded in the memory 32. When these signals include a teletext signal, this teletext signal is decoded by the teletext decoder 44, and a desired page of the decoded teletext signal is selected by the input key matrix 92 to be recorded in the page memory 34. On the other hand, an on-screen display control signal generated from the microprocessor 90 is applied to the display controller 43, and the character generator built in the display controller 43 generates a character signal which is recorded in the memory 33.

The recorded information is read according to a sequence which will be described now.

It is assumed that the display screen of the CRT display 81 is divided into three display parts as shown in FIG. 1.

It is further assumed that the output signal of the tuner 10 is displayed on the first display part $P_1$, the associated teletext signal is displayed on the second display part $P_2$, and the status is displayed on the third display part $P_3$. In such a case, the signal recorded in the memory 31 is read out at the aforementioned horizontal frequency of 64.5 kHz or 64 kHz, and the picture is displayed on the first display part $P_1$. The signal recorded in the memory 32 is then read out during the period of scanning the portion E in FIG. 1 to be converted into the corresponding character or like information, and the teletext information is displayed on the second display part $P_2$. During the remaining period of 1H, the signal recorded in the memory 33 is read out and converted into the corresponding character or like information, so that the status including the program number, the state of the DA converter and the state of the input switches is displayed on the third display part $P_3$. In this case, at the time of switching the memory reading from the memory 31 to the memory 33 or 34, it is necessary to decrease the vertical amplitude in the period of scanning the guard band. This is because the area of the second display part $P_2$ is smaller than that of the first display part $P_1$, and the amplitude in the vertical direction must be decreased.

Figure 3:
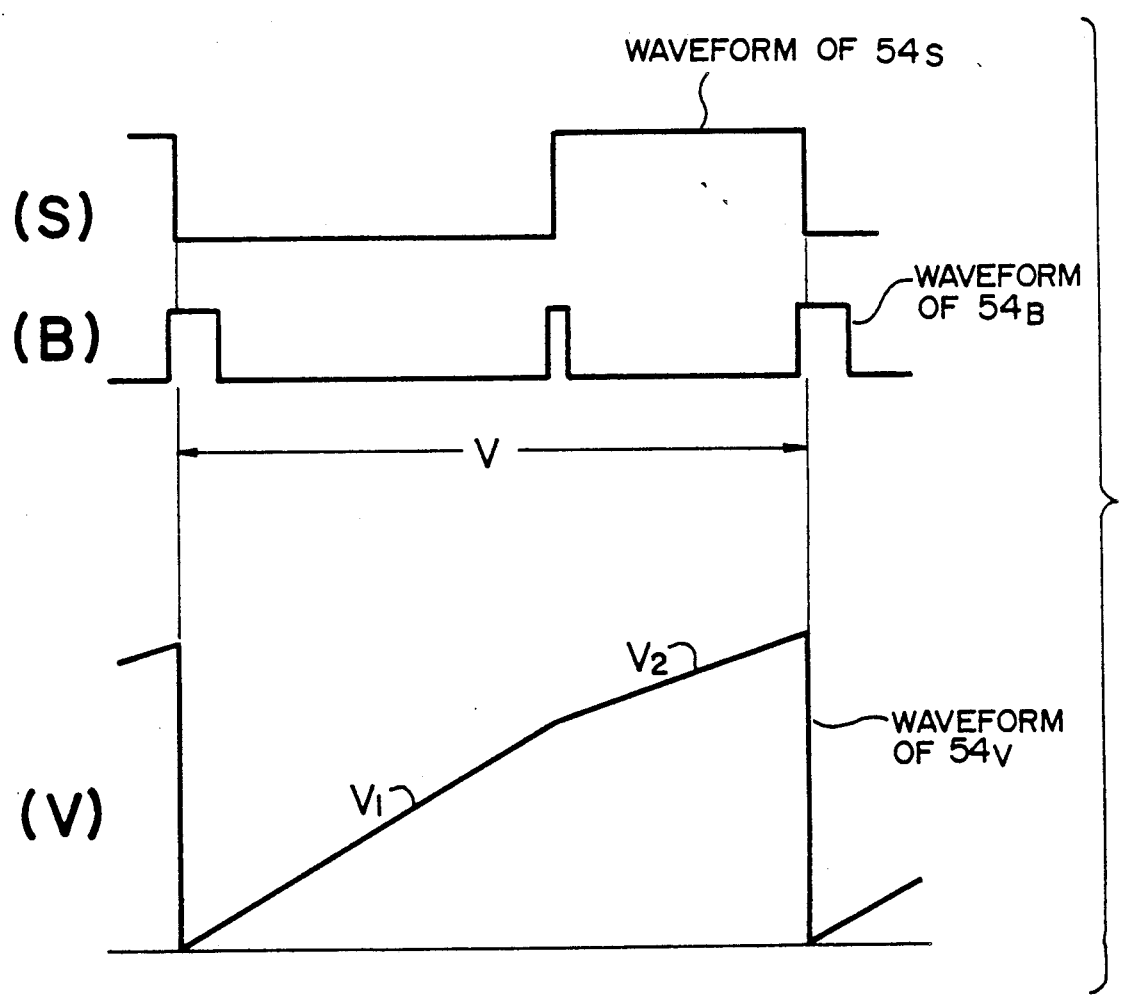
FIG. 3 is a waveform diagram showing waveforms of a vertical deflection signal, a blanking signal and a switching signal.

The position of switching the memory scanning described above can be easily determined by counting the number of pulses of a horizontal synchronizing signal produced by the processor 54 on the basis of the clock generator 24. Such an output signal 54V of the processor 54 has a waveform as shown at V in FIG. 3. Further, the processor 54 generates an output signal 54S synchronous with the switching timing, and this signal 54S has a waveform as shown at S in FIG. 3. This signal 54S is used, for example, for switching over the luminance.

Further, the processor 54 generates a blanking signal 54B which is added to the ordinary horizontal and vertical blanking signals to blacken the guard band portions. It is apparent that this blanking signal 54B may be applied to the R, G, B circuits when a color other than black is desired. This blanking signal 54B has a waveform as shown at B in FIG. 3.

The scanning speed in the horizontal direction is preferably maintained constant because the deflection speed in the horizontal direction cannot be easily changed. Therefore, when, at the time of memory reading, the memories 33 and 34 are considered to be an integral memory, and the memory 34 is distinguished from the memory 33 according to the memory location, the scanning speed in the horizontal direction need not be switched depending on the positions of the second and third display parts $P_2$ and $P_3$. However, when the guard band is provided between these display parts $P_2$ and $P_3$, it is necessary to insert a blanking signal at a position corresponding to the boundary between these display parts $P_2$ and $P_3$. Such a blanking signal is included in the blanking signal 54B.

The microprocessor 9o which controls the television system having the structure described above has ordinary control functions of, for example, controlling the tuning and controlling the DA converter. In addition to those functions, the microprocessor 90 has various functions including a function of changing the order of writing or reading information in or out of the memories 31, 32 and 33 thereby changing information displaying positions or exchanging displayed pictures, a function of changing the reading speed, a function of switching over the outputs of the controllers 41 and 42, a function of controlling the status display, and a function of controlling the teletext decoder 44 and stereo decoder 26. These functions are achieved under control of the input key matrix 92. It is also apparent that part of the input ports may be utilized to achieve those functions under remote control.

According to the present invention, two video information and status information can thus be displayed on the display screen of the single CRT without cutting out part of those video information.

In the case of a prior art on-screen display, the status is displayed at the sacrifice of part of displayed video information, resulting in an incomplete display of the information. In order to avoid the interference, small characters are displayed or displayed characters are erased. However, there are functions that should be ordinarily activated. For example, whether or not the type of broadcasting is stereophonic broadcasting should be ordinarily displayed, and, in the case of the stereophonic broadcasting, whether or not the sound is being broadcast in a stereophonic mode should also be ordinarily displayed. In the case of the prior art manner of display, these functions had to be displayed in an off-screen mode. The above fact applies also to the display of characters of teletext broadcasting. At present, the teletext information is displayed on the entire display screen or displayed in a relation superimposed on video information being broadcast. This superimposed teletext display is impractical in that the video information being broadcast is extremely interfered. The present invention obviates all of such prior art disadvantages, and a viewer or even a plurality of viewers can freely select one or more of the display parts.

In the television receiver of the present invention, the two display parts $P_1$ and $P_2$ have different sizes and locations. Therefore, by exchanging the positions of these two display parts $P_1$ and $P_2$, the viewer can freely select the display part on which a larger picture can be displayed. Further, the layout of these display parts $P_1$ and $P_2$ can be freely selected.

In order to exchange the information to be displayed on the display parts $P_1$ and $P_2$, the aforementioned order of reading out the signals written in the memories 31, 32, 33 and 34 may merely be changed. When the signal written in the memory 34 is first read out with the clock timing used for reading out the signal written in the memory 31, the contents of the memory 34 is displayed on the first display part $P_1$. Then, by reading out the contents of the memory 33 with the clock timing used for reading out the contents of the memory 32/memory 33, then reading out the contents of the memory 33/memory 31 within the period of 1H in a time sharing mode, and scanning the display parts $P_2$ and $P_3$ by the 525 or 625 horizontal scanning lines in the vertical direction, the status is displayed on the display part $P_3$ occupying the lower left-hand part of the display screen, and the televised picture of small size is displayed on the display part $P_2$ occupying the lower right-hand side of the display screen.

Similarly, the upper display part $P_1$ and the lower display parts $P_2$, $P_3$ can be exchanged, and display positions can be freely selected by the will of the viewer.

The present invention requires a single CRT only. Therefore, a television set is small in size, and yet multiple video information can be displayed on the display screen of the single CRT. Further, the shape of the display screen is slim because it is oblong in the vertical direction. Therefore, speakers having a relatively large size can be easily disposed on both sides respectively of the CRT. This is advantageous also from the viewpoint of an improvement in the sound quality of the television set.

The television system incorporated in the television receiver of the present invention includes one-frame (or one-field) buffer memories. Therefore, when the frequency of the clock signal and the reading timing are suitably selected, a 100% display can be provided on the display screen even by overscanning the display parts.

It will be understood from the foregoing description of the present invention that two different video information and status information can be displayed on the same display screen of a single CRT without cutting out part of the displayed video information.

I claim:

1. A television receiving for displaying multiplex video information on a screen, said receiver comprising means for arranging a single CRT display having an aspect ratio of approximately 4:3 in an attitude in which its display screen is vertically oblong, means for dividing the entire area of said display screen to provide a horizontally oblong display part defining a first display area having an aspect ratio of approximately 4:3, means for dividing the remaining area of said display screen to provide another area having an aspect ratio of approximately 4:3, and means for utilizing the final remaining area of said display screen to define a third display area, wherein video information is displayed on one of said first display area and said second display area, and information related to or supplementing the video information displayed on said one of said first and second display area is displayed on the other of said first and second display area respectively.

2. A television receiver according to claim 1 wherein information indicating the status of at least one of the information displayed on said first and second display areas is displayed on said third display area.

3. A method of displaying video information comprising the steps of providing a television receiver with a single CRT display having an aspect ratio of approximately 4:3 in an attitude in which its display screen is vertically oblong, dividing the entire area of said display screen to provide a horizontally oblong display part defining a first display area having an aspect ratio of approximately 4:3, dividing the remaining area of said display screen to provide another horizontally oblong display part defining a second display area, and utilizing the final remaining area of said display screen to define a third display area, wherein video information is displayed on one of said first display area and said second display area, and information related to or supplementing the video information displayed on said one of said first and second display area is displayed on the other of said first and second display area respectively.

4. A method of displaying video information according to claim 3 wherein information indicating the status of at least one of the information displayed on said first and second display areas is displayed on said third display area.

* * * * *